(12) United States Patent
Amaya et al.

(10) Patent No.: US 9,833,841 B2
(45) Date of Patent: Dec. 5, 2017

(54) CUTTING METHOD FOR INNER CIRCUMFERENTIAL FACE OR OUTER CIRCUMFERENTIAL FACE OF WORK

(71) Applicant: Matsuura Machinery Corporation, Fukui, Fukui (JP)

(72) Inventors: Kouichi Amaya, Fukui (JP); Toshihiko Kato, Fukui (JP); Yasuori Takezawa, Fukui (JP); Zempoh Shirahama, Fukui (JP); Tetsuya Igarashi, Fukui (JP); Shuichi Ohashi, Fukui (JP)

(73) Assignee: Matsuura Machinery Corporation, Fukui, Fukui (JP)

( * ) Notice: Subject to any disclaimer, the term of this patent is extended or adjusted under 35 U.S.C. 154(b) by 16 days.

(21) Appl. No.: 15/069,092

(22) Filed: Mar. 14, 2016

(65) Prior Publication Data
US 2017/0095863 A1   Apr. 6, 2017

(30) Foreign Application Priority Data
Oct. 2, 2015   (JP) .................. 2015-196514

(51) Int. Cl.
*B23B 3/26* (2006.01)
*B23B 5/36* (2006.01)
*B23B 5/38* (2006.01)

(52) U.S. Cl.
CPC .................. *B23B 3/26* (2013.01); *B23B 5/36* (2013.01); *B23B 5/38* (2013.01); *B23B 2220/52* (2013.01);
(Continued)

(58) Field of Classification Search
CPC .... B23B 3/26; B23B 3/22; B23B 5/36; B23B 5/38; B23B 2265/08; B23B 29/034;
(Continued)

(56) References Cited

U.S. PATENT DOCUMENTS 3,742,815 A * 7/1973 Sukhov .................. B23B 5/10
409/132
3,803,679 A * 4/1974 Eckhardt ................ B23B 29/12
29/27 R
(Continued)

FOREIGN PATENT DOCUMENTS

EP   2052811 A1   4/2009
JP   60-85802 A   5/1985
(Continued)

OTHER PUBLICATIONS

JP 2009-83071 Machine Translation, pp. 5-9, Jun. 21, 2017.*

*Primary Examiner* — Sunil K Singh
*Assistant Examiner* — Nicole N Ramos
(74) *Attorney, Agent, or Firm* — Richard M. Goldberg

(57) ABSTRACT

A cutting method for an inner circumferential face or an outer circumferential face of a work using a cutting tool projecting from a main shaft which turns around a predetermined position serving as a center and for which a turning radius is adjustable, wherein a table that supports the work is set in a rotating central axis that is coaxial with a turning central axis of the main shaft, and the table is rotated in a direction opposite to a turning direction of the main shaft to increase a cutting velocity. The cutting method allows an increase to the cutting velocity under simple control.

8 Claims, 4 Drawing Sheets

(52) U.S. Cl.
CPC .............. *G05B 2219/36194* (2013.01); *G05B 2219/36202* (2013.01)

(58) Field of Classification Search
CPC ....... B23B 29/03; Y10T 82/12; Y10T 82/125; Y10T 82/128; Y10T 82/14; Y10T 82/148; Y10T 82/152; Y10T 409/300672; Y10T 409/300728; Y10T 409/300784
See application file for complete search history.

(56) References Cited

U.S. PATENT DOCUMENTS

| | | | | |
|---|---|---|---|---|
| 4,651,599 | A * | 3/1987 | Ley | B23Q 27/00 451/211 |
| 4,982,496 | A * | 1/1991 | Gaither | B23B 3/26 29/898.042 |
| 5,137,397 | A * | 8/1992 | Koketsu | B23B 51/102 29/566 |
| 5,150,518 | A * | 9/1992 | Fuchs | B23B 5/46 29/557 |
| 5,779,406 | A * | 7/1998 | Astor | B23C 3/34 29/888.02 |
| 6,631,771 | B2 * | 10/2003 | Hamamura | B23B 35/00 175/24 |
| 6,761,096 | B1 * | 7/2004 | Kochsiek | B23Q 27/00 82/1.11 |
| 7,347,652 | B2 * | 3/2008 | Giovanelli | B23Q 15/14 409/132 |
| 2012/0065768 | A1 * | 3/2012 | Sakata | B23B 29/03482 700/187 |

FOREIGN PATENT DOCUMENTS

| | | | |
|---|---|---|---|
| JP | 60-255303 | A | 12/1985 |
| JP | 2-500351 | A | 2/1990 |
| JP | 03073261 | A * | 3/1991 |
| JP | 6-36701 | U | 5/1994 |
| JP | 8-126938 | A | 5/1996 |
| JP | 08-126938 | A | 5/1996 |
| JP | 2000-190127 | A | 7/2000 |
| JP | 2007-034653 | A | 2/2007 |
| JP | 2009-83071 | A | 4/2009 |
| JP | 2009083071 | A * | 4/2009 |

* cited by examiner

FIG.4 (a)
FIG.4 (b)
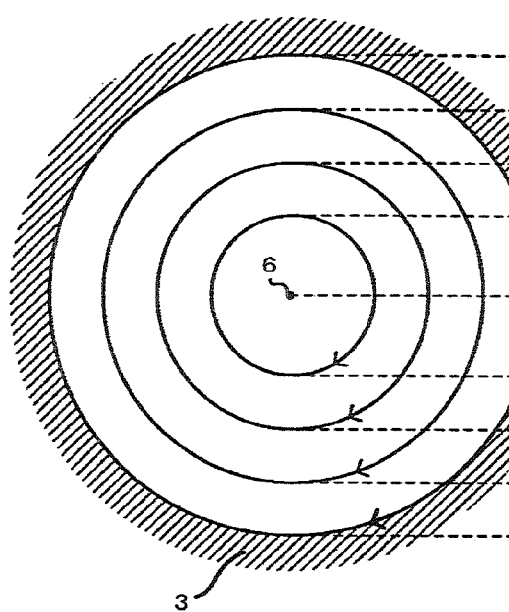
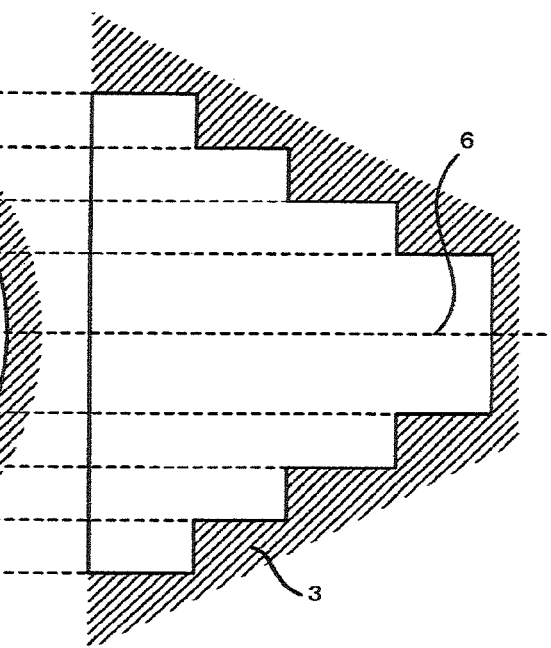

CUTTING METHOD FOR INNER CIRCUMFERENTIAL FACE OR OUTER CIRCUMFERENTIAL FACE OF WORK

BACKGROUND OF THE INVENTION

The present invention relates to a cutting method for an inner circumferential face and an outer circumferential face of a work using a cutting tool of a main shaft which turns around a predetermined position serving as a center and for which a turning radius is adjustable, the cutting being performed by increasing a cutting velocity of the cutting tool.

The "turning of the main shaft" is not limited to rotation of the main shaft along a central axis thereof but refers to rotations including revolution of the main shaft around the predetermined position serving as a center.

What is called an orbit machining that a main shaft turns around a predetermined center has been adopted as a method for forming an inner circumferential face and an outer circumferential face of a work into curved faces variously shaped like cylinders, tapered shapes, flanges, or the like, as disclosed in Patent Literature 1. This machining method is technically advantageous in that machining can be achieved at whatever position a table supporting the work is located.

However, in the orbit machining method according to the related art, the work is not rotated, and cutting is performed only by turning the main shaft. Thus, the cutting velocity is limited.

For cutting of the work, Patent Literature 2 proposes a cutting method involving movement of a table supporting a tool in addition to rotation of the main shaft.

However, in the method in prior arts, the table moves linearly by using ball screw, and no increase of the turning angular velocity of the main shaft is configured (see FIG. 2, and differential equation (1), and (2) in section).

Furthermore, the rotation of the main shaft and the movement of the table need to be controlled based on complicated expressions (for example, expressions (5)-(99) shown in sections.

Patent Literature 3 proposes a configuration in which the rotation of the main shaft be reinforced by circular arc motion of the work. However, the configuration needs to be controlled based on complicated operations in which the number of rotations of the main shaft is synchronized with the relative circular-arc complemental motion of the work in a predetermined ratio.

Thus, for the cutting of the inner circumferential face or the outer circumferential face of the work, no cutting method has been proposed to increase the cutting velocity of the cutting tool and to provide a simple control for increase.

RELATED ART LITERATURE

Patent Literature

Patent Literature 1: JP H08-126938 A
Patent Literature 2: JP 2007-34653 A
Patent Literature 3: JP 2000-190127 A

BRIEF SUMMARY OF THE INVENTION

According to the present invention, there is provided a cutting method in which, in cutting an inner circumferential face or an outer circumferential face of a work based on turning of a main shaft around a predetermined position serving as a center, a cutting velocity is increased and this increase is simply controlled to enable quick cutting of the inner circumferential face and the outer circumferential face of the work.

According to the present invention, there are further provided a basic configuration (1); a cutting method for an inner circumferential face or an outer circumferential face of a work comprising the steps of setting a table that supports the work in a rotating central axis that is coaxial with a turning central axis of the main shaft, rotating the table in a direction opposite to a turning direction of the main shaft to increase a cutting velocity of the cutting tool, and turning a cutting tool projecting from a main shaft around a predetermined position serving as a turning center and for which a turning radius from the turning center is adjustable, so that the cutting tool is adapted to cut a circumferential curved face of the work as well as other shaped curved faces of the work, by adjusting the turning radius, a basic configuration (2) the cutting method for an inner circumferential face or an outer circumferential face of the work of the basic configuration (1), wherein a position of a turning center of the main shaft is movable in an orthogonal direction or an oblique direction to a plane orthogonal to the turning central axis, and when the position of the turning center of the main shaft is movable in the oblique direction, moving a rotating central position of the table in association with the movement in the oblique direction to maintain the coaxial state.

In the aspect of the present invention based on the basic configurations (1) and (2), the table supporting the work rotating in a direction opposite to the turning direction of the main shaft allows increase of the cutting velocity without any special control, while the inner circumferential face or the outer circumferential face of the work can be formed into any of various curved faces by controlling a small number of parameters, that is, a turning angular velocity of the main shaft and/or a rotating angular velocity of the table (in the case of the basic configuration (1)) and a turning radius of the main shaft and a moving position and a moving velocity of a turning center of the main shaft in the orthogonal direction or the oblique direction to the plane orthogonal to the turning central axis of the main shaft (in the case of the basic configuration (2)).

That is, the aspect of the present invention eliminates the need for control based on complicated calculations or operations as disclosed in Patent Literature 2 and 3.

BRIEF DESCRIPTION OF THE DRAWINGS

FIGS. 4(*a*) and 4(*b*) denote a method of forming a stepped tapered shape by moving the position of the turning center of the main shaft and changing the turning radius in a stepwise manner, FIG. 4(*a*) being a plan view denoting a locus of movement of the tip of the cutting tool, and FIG. 4(b) being a side view of the stepped tapered shape formed by the stepwise change.

DETAILED DESCRIPTION OF THE INVENTION

Figure 1:
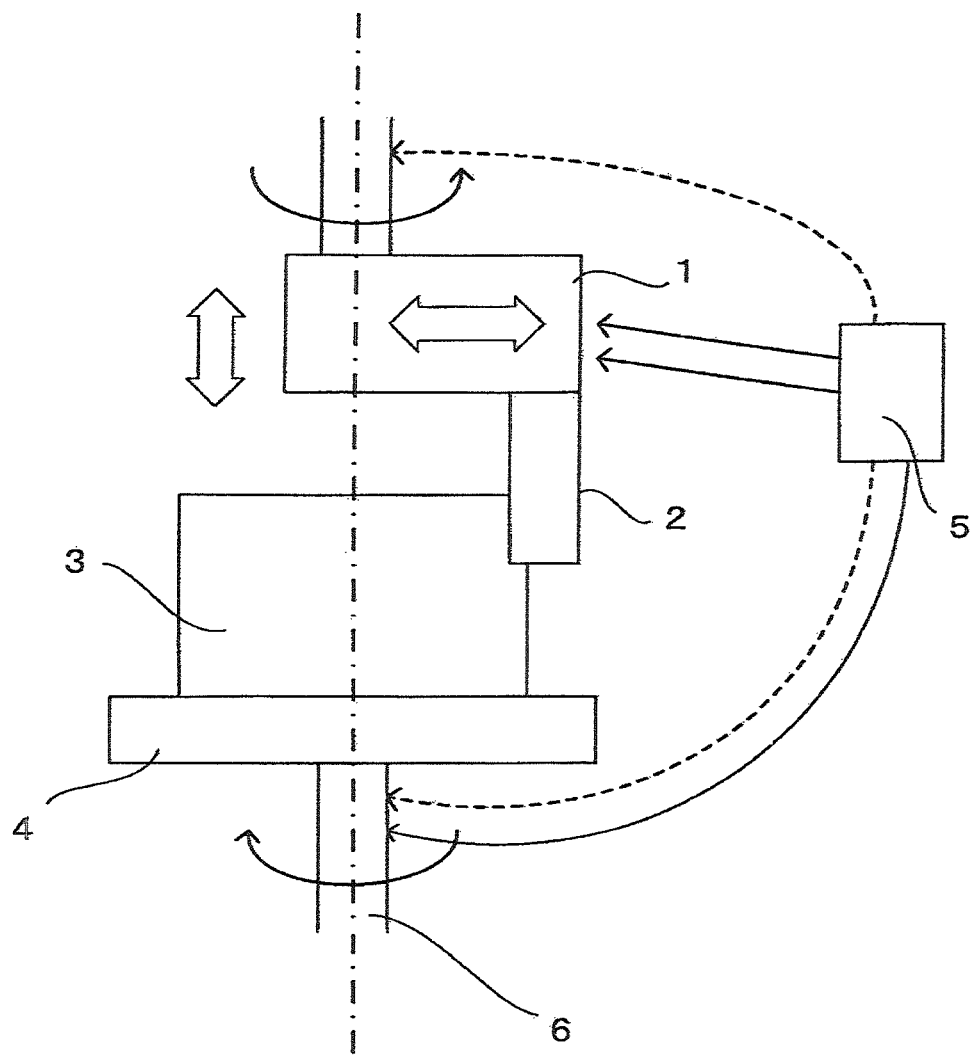
FIG. 1 is a block diagram of a system allowing a method of the present invention to be implemented.

As is denoted in FIG. 1, components of the present invention include a main shaft 1 that turns, a cutting tool 2 provided at a tip side of the main shaft 1, a work 3, a table 4 that supports the work 3, and a control apparatus 5 that controls movement of the main shaft 1 and the table 4 (in FIG. 1, blank arrows indicate a moving state of the main shaft 1 associated with adjustment of a turning radius or a moving state of the main shaft 1 in the orthogonal direction or the oblique direction, curved arrows indicate a turning state by revolution of the main shaft 1 and a rotating state of the table 4, a dotted arrow from the control apparatus 5 indicates a state where signals which allow a turning angular velocity and a rotating angular velocity to be controlled are dispatched, and solid arrows indicate states where signals are dispatched which allow control of movement of the main shaft 1 associated with adjustment of the turning radius of the main shaft 1, and in the basic configuration (2), control of movement of the rotating center of the table 4 associated with movement of the turning center of the main shaft 1 in the orthogonal direction or the oblique direction and movement of the turning center of the main shaft 1 in the oblique direction).

In the present invention, elements to be controlled are parameters indicative of the turning angular velocity of the main shaft 1 with respect to the turning center and/or the rotating angular velocity of the table 4, the turning radius of the main shaft 1 (above-described elements correspond to the basic configuration (1)), and further the moving position and the moving velocity of the turning center in the orthogonal direction or the oblique direction with respect to a plane orthogonal to a central axis 6 for turning of the main shaft 1 (the above-described elements correspond to the basic configuration (2)). For the basic configuration (1), the number of the parameters is only two or three, and for the basic configuration (2), the number of the parameters is only three or four.

Moreover, the turning angular velocity and the rotating angular velocity act in the opposite directions and are thus naturally increased together. Since the need for special control to increase the cutting velocity is eliminated, a control method is very simple.

The main shaft 1 and the cutting tool 2 make turning motion around a predetermined central position. A tip of the cutting tool 2 cuts an inner circumferential face of the work 3 as is denoted in FIG. 2(a) or cuts an outer circumferential face of the work 3 as is denoted in FIG. 2(b). The turning radius of the main shaft 1 from the central position is adjustable, and thus, the radius of curvature of the tip of the cutting tool 2 is also adjustable, allowing a cutting curved face to be optionally selected.

Figure 2:
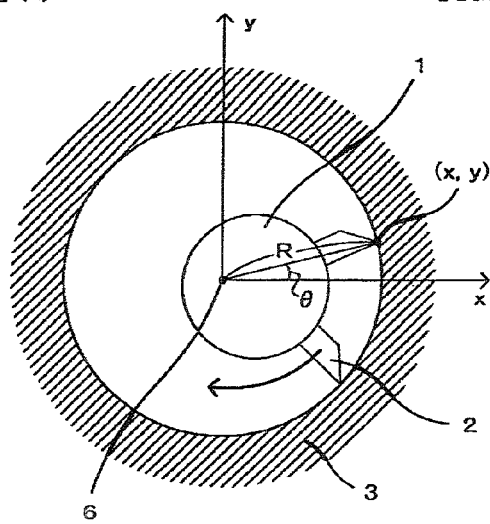
FIGS. 2(*a*) and 2(*b*) are plan views denoting the state of a plane in a direction orthogonal to a turning central axis of a main shaft, FIG. 2(*a*) denoting that an inner circumferential face is cut, and FIG. 2(*b*) denoting that an outer circumferential face is cut.
Figure 2:
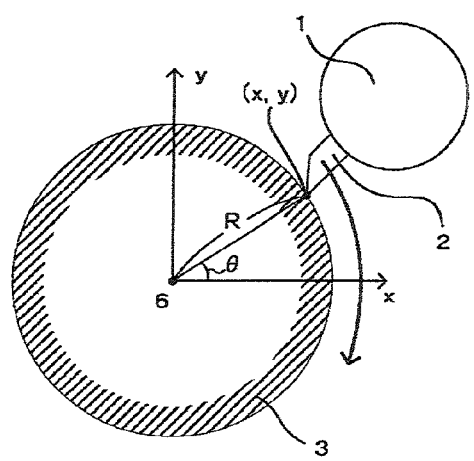

That is, circumferential curved faces in FIGS. 2(a) and 2(b) only denote typical examples based on rotation by the composition of the revolution of the main shaft 1 and the rotation of the table 4. The cutting curved face is not necessarily limited to the circumferential curved face.

The cutting velocity of the cutting tool 2 needs to be constant in order to provide an even cutting face.

In view of such a demand, for the basic configurations (1) and (2), an embodiment is often adopted in which the total of the turning angular velocity of turning of the main shaft 1 and the rotating angular velocity of the work 3 is increased with decreasing distance from the turning center to the tip of the cutting tool 2.

In particular, the use of simple expressions as is described below enables the cutting velocity of the tip of the cutting tool 2 to be set to a constant value C.

As is denoted in FIGS. 2(a) and 2(b), in the case that the distance from the turning center to the tip of the cutting tool 2 is represented as R, and an angular position of the cutting tool 2 is represented as $\theta$, and that a coordinate position of the cutting tool 2 is represented as (X, Y), then $X = R \cos \theta$ and $Y = R \sin \theta$ is formulated and $$\dot{X} = \dot{R} \cos \theta - R\dot{\theta} \sin \theta, \dot{Y} = \dot{R} \sin \theta + R\dot{\theta} \cos \theta$$

is formulated (dots over reference characters indicate time differentials).

Therefore, when the cutting velocity is represented as V, $$V^2 = \dot{X}^2 + \dot{Y}^2 = \dot{R}^2 + R^2 \dot{\theta}^2$$

is formulated.

According to the above-described relational expressions, wherein, in the case that the turning angular velocity of the main shaft 1 is represented as $\omega_1$ and the rotating angular velocity of the table 4 is represented as $\omega_2$, the constant value C may be preset and controlled to formulate $$\omega_1 + \omega_2 = \dot{\theta} = \left(C^2 - \dot{R}^2\right)^{\frac{1}{2}} / R$$

in association with the distance R and $\dot{R}$ that is a time differential of the distance R, in order to allow the tip of the cutting tool 2 to operate at a constant cutting velocity V.

In the present invention, to form each of the inner and outer circumferential faces into any of various cutting shapes, the following embodiment may be adopted. That is, as shown in the basic configuration (2), the position of the turning center of the main shaft 1 is movable in an orthogonal direction or an oblique direction to the plane orthogonal to the turning central axis 6. When the position of the turning center of the main shaft 1 is movable in the oblique direction, a rotating central position of the table 4 is also moved in association with this movement to maintain the coaxial state.

When the turning center of the main shaft 1 is movable in the oblique direction as is described above, the turning central axis 6 of the main shaft 1 moves by itself. Thus, the rotating central position of the table 4 is forced to move with synchronized state to the position of the turning center in order to maintain the coaxial state.

Figure 3:
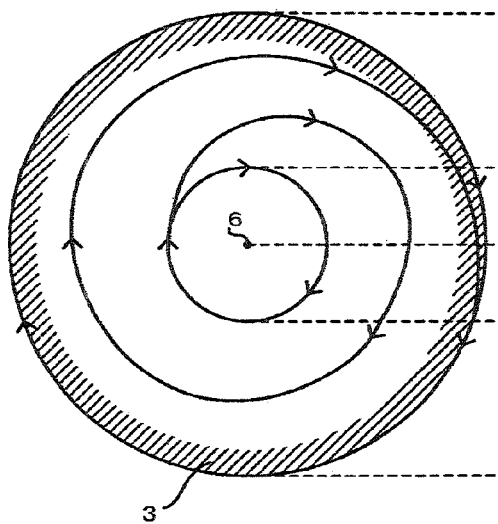
FIGS. 3(*a*) and 3(*b*) denote a method of forming a normal tapered shape by moving the position of a turning center of the main shaft and sequentially changing a turning radius, FIG. 3(*a*) being a plan view denoting a locus of movement of a tip of a cutting tool, and FIG. 3(*b*) being a side view of the tapered shape formed by the sequential change.
Figure 3:
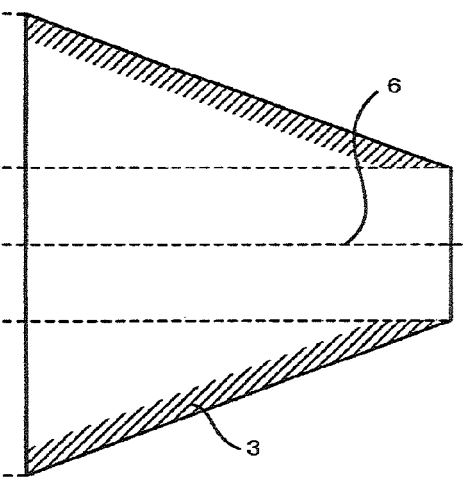

FIGS. 3(a) and 3(b) denote that the outer circumferential face is formed into a normal tapered shape in accordance with the embodiment in which the position of the turning center of the main shaft 1 is moved in the orthogonal direction or the oblique direction, while the turning radius is sequentially changed.

When the tapered shape has circumferential curved faces at opposite ends thereof, the turning radius may be approximately constant at an initial stage and a final stage of turning as is denoted in FIGS. 3(a) and 3(b).

FIGS. 4(a) and 4(b) denote that the inner circumferential face is formed into a stepped tapered shape in accordance with the embodiment in which the position of the turning center of the main shaft 1 is moved in the orthogonal direction or the oblique direction, while the turning radius is changed in a stepwise manner.

As is apparent from FIGS. 3(a) and 3(b) and FIGS. 4(a) and 4(b), the basic configuration (2) enables the inner circumferential face or the outer circumferential face to be formed into any of various shapes.

The above-described drawings all denote that the turning center of the main shaft 1 is moved in the direction orthogonal to the plane orthogonal to the turning central axis 6, that is, in the same direction as that of the turning central axis 6. When the turning center is moved in the direction oblique to the plane, a tapered shape is obtained which generally changes in the oblique direction.

Alternatively to the embodiments denoted in FIGS. 3(a) and 3(b) and FIGS. 4(a) and 4(b), if the turning radius of the main shaft 1 is not changed, the inner circumferential face or the outer circumferential face (not denoted in the drawings) can be formed into a normal cylindrical shape (when the turning center moves in the orthogonal direction) or an oblique cylindrical shape (when the turning center moves the in the oblique direction).

Figure 5A:
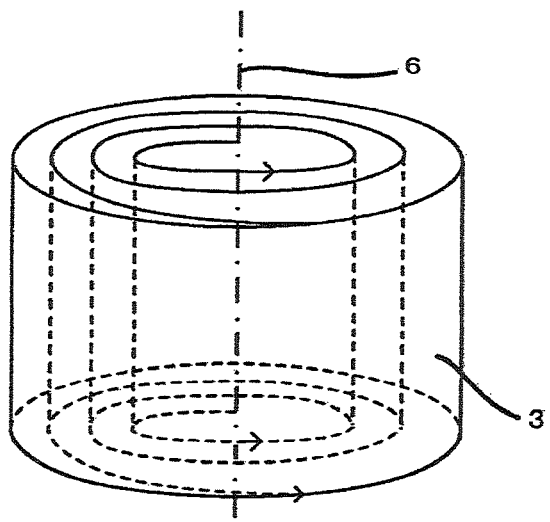
FIGS. 5(a), 5(b), and 5(c) are perspective views denoting a process of forming a ring shape by helically moving and finally circumferentially moving the tip of the cutting tool in an inner region and an outer region of the work without moving the turning center position of the main shaft, FIG. 5(a) denoting a process of forming an inner wall in a ring shape, FIG. 5(b) denoting a process of forming an outer wall in a ring shape, and FIG. 5(c) denoting the finished ring shape.
Figure 5B:
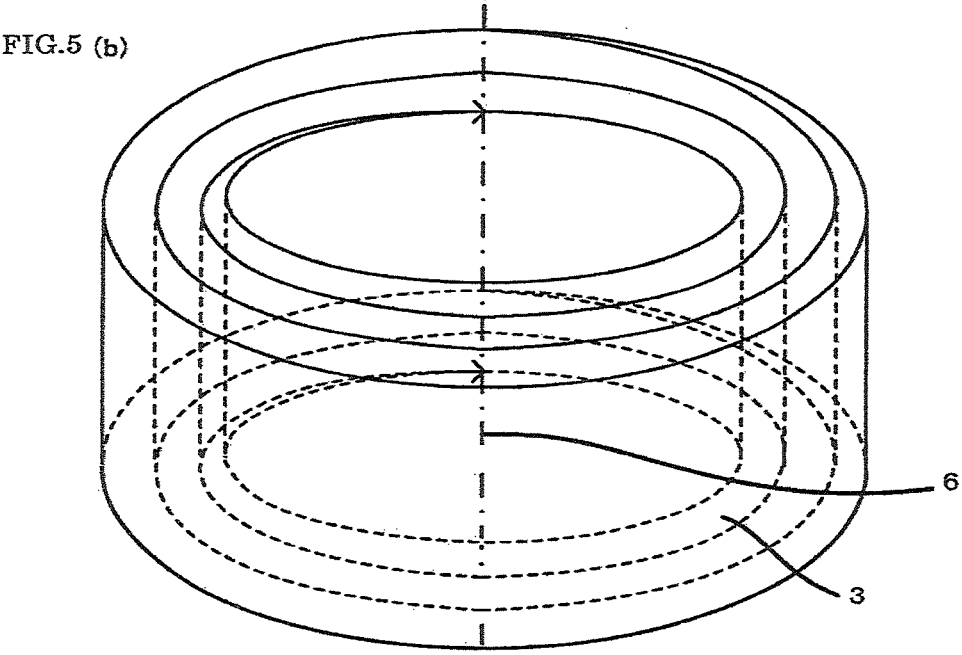
Figure 5C:
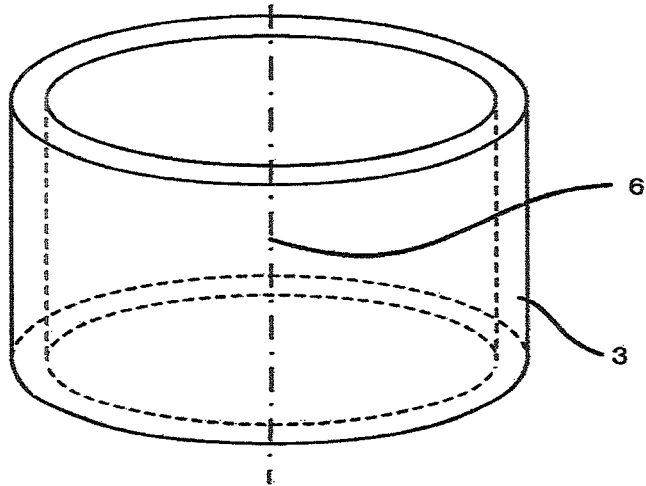

FIG. 5 denotes an embodiment in which the position of the turning center of the main shaft 1 is not moved in the orthogonal direction nor the oblique direction. In the embodiment, a ring shape is formed as follows:

(1) In an inner region of the work 3 that is close to the turning center, the distance from the turning center to the tip of the cutting tool 2 is sequentially increased to move the tip along a helical locus, in the case that the distance reaches a maximum state, the maximum state is maintained to form an inner wall in a ring shape.

(2) In an outer region of the work 3 that is away from the turning center, the distance from the turning center to the tip of the cutting tool 2 is sequentially reduced to move the tip along a helical locus, in the case that the distance reaches a minimum state, the minimum state is maintained to form an outer wall in a ring shape.

In the above-described embodiment, the ring shape can be quickly obtained.

Thus, in the present invention, the work 3 is cut with an increase of the cutting velocity to allow the inner circumferential face and the outer circumferential face to be quickly formed. The need for special control for the summation is not required to achieve simple control.

Example

In an example, at least one of the turning angular velocity of the main shaft 1 and the rotating angular velocity of the work 3 is made constant.

In this example, at least one of the turning angular velocity of the main shaft 1 and the rotating angular velocity of the table 4 need not be controlled.

Therefore, when the turning center of the main shaft 1 is moved in the orthogonal direction or the oblique direction with respect to the plane, control with three parameters can be performed. When the turning center of the main shaft 1 is not moved in the orthogonal direction or the oblique direction with respect to the plane, control with two parameters can be performed. Consequently, very simple control can be achieved.

As is described above, the present invention enables the inner circumferential face and the outer circumferential face of the work to be quickly cut into any of various shapes under simple control with a small number of parameters. Thus, the present invention has enormous applicability.

What is claimed is:

1. A cutting method for an inner circumferential face or an outer circumferential face of a work, comprising the steps of:
    setting a table that supports the work in a rotating central axis that is coaxial with a turning central axis of a main shaft, and
    rotating the table in a direction opposite to a turning direction of the main shaft to increase a cutting velocity of the cutting tool, and
    turning a cutting tool projecting from the main shaft around a predetermined position serving as a turning center and for which a turning radius from the turning center is adjustable, so that the cutting tool is adapted to cut a circumferential curved face of the work as well as other shaped curved faces of the work, by adjusting the turning radius.

2. The cutting method for an inner circumferential face or an outer circumferential face of a work according to claim 1,
    wherein a position of a turning center of the main shaft is movable in one of:
        an orthogonal direction and
        an oblique direction
    to a plane orthogonal to the turning central axis, and
    when the position of the turning center of the main shaft is movable in the oblique direction, moving a rotating central position of the table in association with the movement in the oblique direction to maintain the coaxial state.

3. The cutting method for an inner circumferential face or an outer circumferential face of a work according to claim 1, further comprising the step of increasing a total of a turning angular velocity of turning of the main shaft and a rotating angular velocity of the work with a decreasing distance from the turning center to a tip of the cutting tool.

4. A cutting method for an inner circumferential face or an outer circumferential face of a work using a cutting tool projecting from a main shaft which turns around a predetermined position serving as a turning center and for which a turning radius is adjustable, comprising the steps of:
    setting a table that supports the work in a rotating central axis that is coaxial with a turning central axis of the main shaft,
    rotating the table in a direction opposite to a turning direction of the main shaft to increase a cutting velocity of the cutting tool,
    increasing a total of a turning angular velocity of turning of the main shaft and a rotating angular velocity of the work with a decreasing distance from the turning center to a tip of the cutting tool, and
    in the case that the turning angular velocity of the main shaft is represented as $\omega_1$, the rotating angular velocity of the table is represented as $\omega_2$, the distance from the turning center to the tip of the cutting tool is represented as R, and a cutting velocity of the tip of the cutting tool is set to a constant value C, making the cutting velocity of the cutting tool constant by performing control such that $\omega_1+\omega_2$ changes in association with a change in the distance R so that $$\omega_1 + \omega_2 = \left(C^2 - \dot{R}^2\right)^{\frac{1}{2}} \Big/ R$$

is formulated where $\dot{R}$ denotes a time differential of the distance R.

5. The cutting method for an inner circumferential face or an outer circumferential face of a work according to claim 2, further comprising the step of moving the position of the turning center of the main shaft in one of the orthogonal direction and the oblique direction, while the turning radius is sequentially changed.

6. The cutting method for an inner circumferential face or an outer circumferential face of a work according to claim 2, further comprising the step of moving the position of the turning center of the main shaft in one of the orthogonal direction and the oblique direction, while the turning radius is changed in a stepwise manner.

7. A cutting method for an inner circumferential face or an outer circumferential face of a work using a cutting tool projecting from a main shaft which turns around a predetermined position serving as a turning center and for which a turning radius is adjustable, wherein a position of the turning center of the main shaft is not moved in an orthogonal direction nor an oblique direction, and comprising the steps of:

setting a table that supports the work in a rotating central axis that is coaxial with a turning central axis of the main shaft, rotating the table in a direction opposite to a turning direction of the main shaft to increase a cutting velocity of the cutting tool, and forming a ring shape by the following steps:
(1) in an inner region of the work that is close to the turning center, sequentially increasing the distance from the turning center to the tip of the cutting tool to move the tip along a helical locus, in the case that the distance reaches a maximum state, so that the maximum state is maintained to form an inner wall in a ring shape,
(2) in an outer region of the work that is away from the turning center, sequentially reducing the distance from the turning center to the tip of the cutting tool to move the tip along a helical locus, in the case that the distance reaches a minimum state, so that the minimum state is maintained to form an outer wall in a ring shape.

8. The cutting method for an inner circumferential face or an outer circumferential face of a work according to claim 1, further comprising the step of making at least one of the turning angular velocity of the main shaft and the rotating angular velocity of the work constant.

\* \* \* \* \*